Patented Apr. 30, 1929.

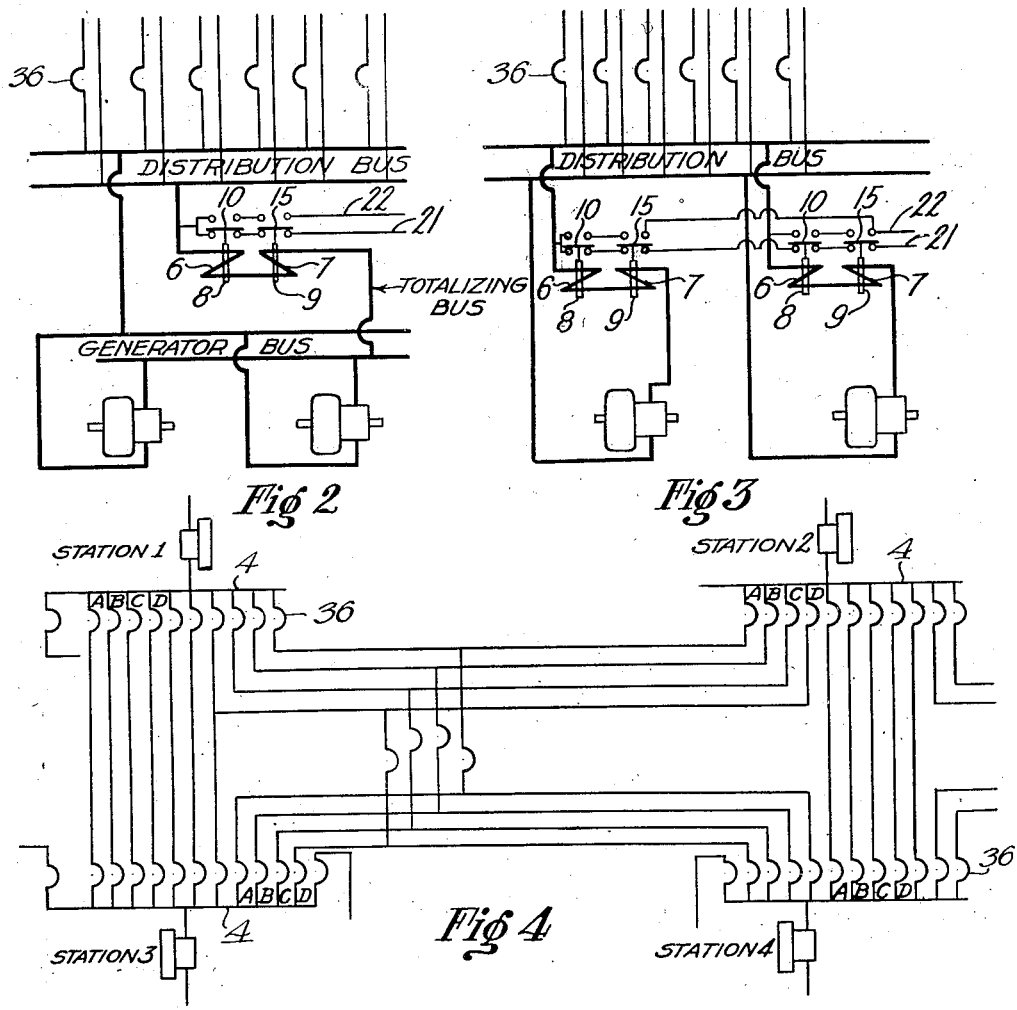

1,710,895

UNITED STATES PATENT OFFICE.

ESTELL C. RANEY, OF COLUMBUS, OHIO, ASSIGNOR TO THE AUTOMATIC RECLOSING CIRCUIT BREAKER COMPANY, OF COLUMBUS, OHIO, A CORPORATION OF OHIO.

SYSTEM OF ELECTRICAL DISTRIBUTION.

Application filed December 29, 1921. Serial No. 525,805.

My invention relates to a system of electrical distribution and has to do particularly with those systems embodying a plurality of feeder circuits. These feeder circuits may be supplied from a single source of supply as, for instance, a generator or transformer station, or they may be supplied from multiple sources of supply.

This invention is especially important in its application to a network of distribution which is supplied by a number of generating or transformer stations, since it enables the load on any part of the system to be automatically shifted from an overloaded station to the nearest station which may be operating below its full capacity, the said load, however, being automatically returned to its normal relation to the station from which it has been removed when normal conditions return. It is, therefore, one of the purposes of this invention to duplicate by automatic means the operation of systems in which a central load dispatcher issues instructions to switch-board attendants to cut-off certain feeders or to connect certain feeders when it becomes necessary to transfer the load from one station to other stations. And it will be found that I am able to accomplish, automatically, these things which have hitherto only been attainable by manual control.

My invention consists in the provision of a system in which when the aggregate load of the feeder circuits constitutes an overload on the source of supply at any given station, the current fed to the feeder circuits will be reduced automatically and gradually until the aggregate load of the feeder circuits ceases to overload the source of supply. Then, with my apparatus, the further lowering of the aggregate load on the source of supply will eventually result in making possible the increase of the aggregate load on the source of supply. Preferably, this is done by the automatic and selective disconnection of feeder circuits successively to relieve the overload on the source of supply followed by the automatic and successive connection of selected feeder circuits at the proper time as indicated above. It will be obvious that similar results may be obtained by the automatic insertion or removal of resistance elements in the feeder circuits in accordance with the variation of the aggregate load in the source of supply and that this would be within the scope of my invention.

The results are preferably accomplished by the provision of an automatically reclosing circuit breaker, time switches for controlling opening of the breaker and for controlling closing of the breaker in each feeder circuit, and an upper and lower limit load controlled relay in the supply circuit.

The automatically reclosing circuit breaker in each feeder circuit will automatically open upon short circuit or overload in its feeder circuit. In addition, it will also open whenever the aggregate load on the supply circuit is too great, subject to the effect of the time switch control in each feeder circuit. These time switch controls are adjustable so that the feeder circuits will be selectively and successively disconnected from the supply circuits. And these selective and successive disconnections will only continue until the supply circuit ceases to be overloaded by the aggregate load imposed by the then connected feeder circuits, which is determined by the upper limit coil of the load controlled relay in the supply circuit. Then, whenever this aggregate load decreases to a predetermined extent, the lower limit load controlled switch together with the time switch units in each feeder circuit, causes a reconnection of the feeder circuits selectively and successively until they are all reconnected or until the connection of any more feeder circuits would produce an aggregate load in excess of a predetermined value.

The preferred embodiment of my invention is shown in the accompanying drawings wherein similar characters of reference designate corresponding parts and wherein Figure 1 is a diagrammatic representation of a station having a single generating unit supplying current to a distributing bus to which a number of feeders are connected by means of automatic switching mechanism. For the sake of clearness, the details of connection are shown on two feeders only, it being understood that any number of feeders would be connected in a similar manner.

Figure 2 illustrates a station having two generating units supplying current to a generator bus that supplies current through a single load control relay to a distributing bus which in turn supplies current to a plurality of feeders.

Figure 3 illustrates a station having two generators, each having a load control relay connected to the distributing bus. It will be understood that in Figures 2 and 3 each of the feeder circuits may be connected to the distributing bus by switching mechanism having the same characteristics as those shown in Figure 1.

Figure 1:
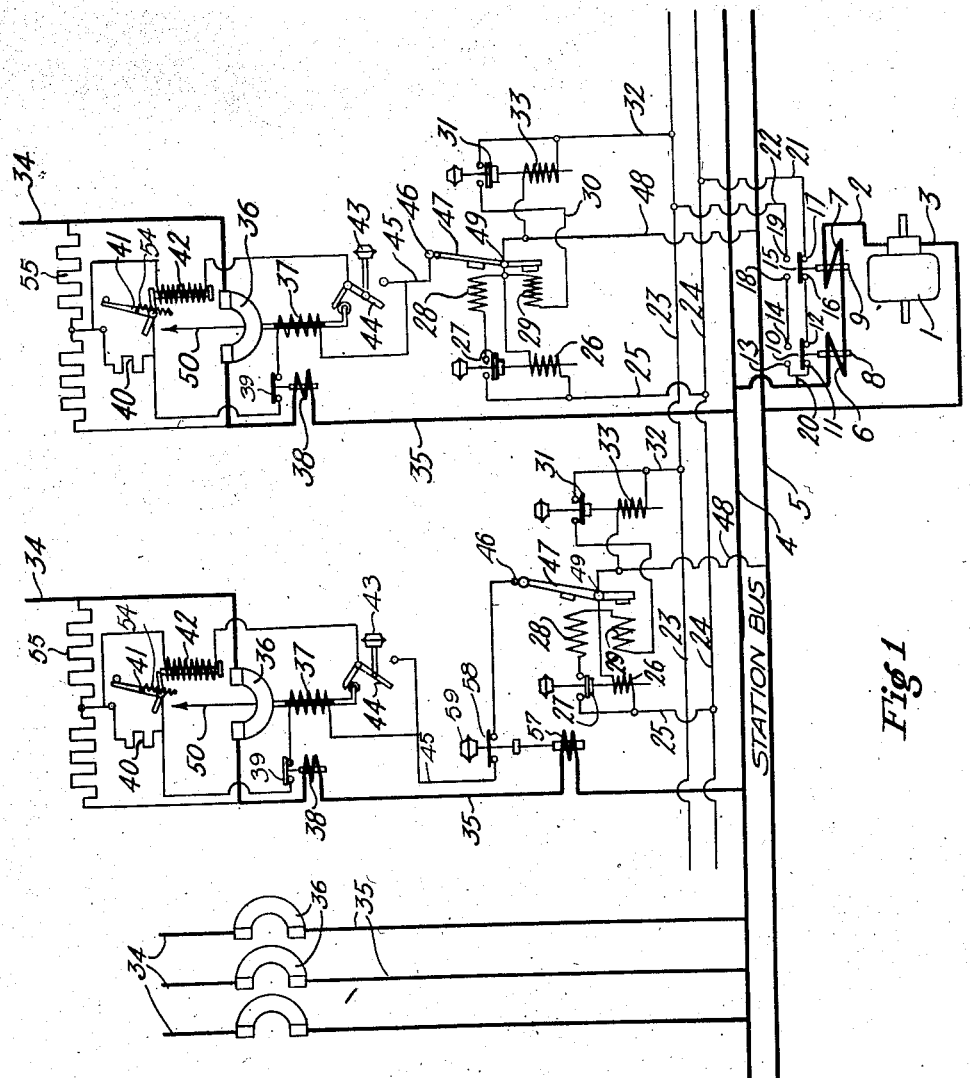

Figure 4 shows a typical network of distribution in which feeders from four stations are interconnected in such a way as to permit of shifting part of the load from one station to the other station. The number of such stations may be increased as may be desired. The control of all or part of the feeders in such stations will be similar to that in Figure 1.

It is believed that a ready understanding of my invention will best be had by a preliminary enumeration of the main operating units coupled with a statement of the functions thereof. Therefore, I am giving this statement immediately below and am omitting therefrom reference to many details of structure and am refraining from tracing circuits. This will be followed by a more detailed description and then by a description of operation.

In the drawings, and with particular reference to Figure 1, the main operating units of my apparatus comprise a generator 1 having conductors 2 and 3 through which current is supplied to bus bars 4 and 5. Leading from these bus bars are feeder circuits that may be designated 34.

An automatically reclosing circuit breaker is located in each feeder circuit with its main contact member at 36. The breaker will automatically open in response to overload in the feeder circuit by means of the overload coil 38 which, when energized, will serve to open the circuit of the circuit breaker reclosing and holding coil 37. Reclosing of the breaker will be effected under the control of coil 42 which operates the switch 41 to short circuit the resistance 40 and thereby make an effective circuit through coil 37.

In the circuit through the reclosing coil there is a switch member 47, which forms an additional control for the opening and closing of the breaker. When the conditions in the feeder circuits are normal, the member 47 is moved into contact with the point 46 by the coil 28 which effects the closing of the breaker, and is moved away from said point by coil 29 which effects the opening of the breaker.

The circuits through coils 28 and 29 are in turn controlled by time switches 27 and 31 respectively. The switches 27 and 31 are preferably set so that the switches 27 and 31 in different feeder circuits operate after relatively different time intervals after energizing of their respective operating coils. Their operation is effected by coils 26 and 33.

The coils 26 and 33 are under the control of a double coil relay in the supply circuit. The double coil relay comprises coils 6 and 7 in the conductor 2 and respectively operating bridge contact members 10 and 15 each of which bridge a pair of contacts when raised and another pair of contacts when lowered. The cores 8 and 9 of the relay coils are adjustable and are set to raise their contact bridges at different values of current. They are so set that they will not both be raised except when the aggregate load on the feeder circuits constitutes an overload on the supply circuit through lines 2 and 3.

When both of the bridges 10 and 15 are raised, which means an overload is on the supply circuit, an operating circuit will be established through the coils 33 in all of the feeder circuits. This will result in the successive raising of the switches 31 in each feeder circuit. When the first switch 31 makes contact after its particular set time, it closes the circuit through its complemental coil 29 through the contact 31 which thereupon attracts the lower armature on switch 47 to move this switch away from contact point 46 and thereby open the circuit through coil 37 with the result that its associated circuit breaker 36 is opened and the feeder circuit is disconnected.

The remaining feeder circuits will then be disconnected in a similar way, one by one, as controlled by the periodicity of the switches 31, until the overload on the supply circuit is removed, whereupon the bridge 15 will drop and break the circuit through coils 33. However, the disconnected feeder circuits will not be reconnected until the aggregate load of the connected feeder circuits drops below a predetermined value as determined by the characteristics of the coil 6 and its associated parts. When this occurs, the bridge 10 will drop and this will energize all the coils 26 in the various feeder circuits. These coils 26 will then actuate the switches 27 which are timed to selectively and successively close. They will continue to close in succession as long as the aggregate load is not in excess of the value of current upon which the coil 6 is set or constructed to raise the bridge 10.

Referring to the drawings, and particularly to Figure 1 thereof, for a more detailed description of my apparatus, 1 designates a generator having conductors 2 and 3 through which current is supplied to distributing bus bars 4 and 5. Interposed in conductor 2 between 1 and 4 is a load control relay having two coils 6 and 7. Each of these coils is provided with a core which cores are indicated by the numerals 8 and 9, respectively. The cores 8 and 9 of the coils 6 and 7 are independently or otherwise constructed so that each may be set to respond in their movements in either or both directions to any chosen current values within a desired range.

Core 8 carries a bridging contact 10 which closes the connection between contact points 11 and 12 when in its lower position and between points 13 and 14 when in its upper position. The core 9 carries a bridging contact 15 which makes contact with points 16 and 17 when in its lower position and with points 18 and 19 when in its upper position.

Contact points 13 and 11 are connected to conductor 2 by means of conductor 20. The contact points 13, 14, 18 and 19 are located along conductor 22, while the contact points 11, 12, 16 and 17 are located along conductor 21. The conductor 22 is connected to a conductor 23 and thereby serves under chosen conditions to transmit the current which effects the disconnection of the feeder circuits, since the coils 33 are connected to the conductor 23, whereas conductor 21 is connected to a conductor 24 and thus serves under chosen conditions to transmit the current which effects the re-connection of the feeder circuits since the coils 26 are connected to the conductor 24.

Each feeder circuit has two time switch units, one being adapted to control reconnection of the feeder circuits and the other being adapted to control disconnection of the feeder circuit. The time switches which control reconnection are all operated by coils 26 which are connected to the conductor 24 by the wire 25.

The core of each coil 26 carries a contact 27 which is movable at the end of a predetermined time period into position to establish an operating circuit through a coil 28 of a transfer relay. The time switches which control disconnection are all operated by coils 33 which are connected to the conductor 23 by wires 32. They each comprise a contact 31 which is movable at the end of a predetermined time into position to establish an operating circuit through wire 30 and coil 29 of the transfer realy. It will be remembered that the time switches in the feeder circuits are set to operate selectively and successively at chosen intervals, although they may be set to operate in groups.

The feeders 34 are each connected to the distributing bus 4 by means of a conductor 35 and a circuit breaker 36, which is operated and controlled by the reclosing and retaining coil 37 and an overload coil 38. The overload coil 38 operates a current controlling contact 39 located in the circuit through the reclosing and retaining coil 37 for opening the circuit of the coil to open the main circuit breaker.

There is also in the circuit through the reclosing coil a resistance 40 which may be short-circuited by means of a contact arm 41. The contact arm 41 is adapted to be opened by the pressure of the member 50 carried by the main contact member when such main contact member is moved to its closed position. The contact arm is adapted to be closed by the action of the controlling coil 42 and its core. The coil 42, however, is only energized after the main contact member 36 has opened and after the contact 44 has had time to become closed. A dash pot 43, or other time regulable means, operates to delay the closing of the contact 44. The action of coil 42 is to move contact 41 by means of raising a core into position to by-pass resistance element 40. This permits sufficient current to flow through coil 37 to effect closure of the main contact 36.

The conductor 45 serves to complete the circuit through coils 37 and 42 to the contact 46 of the transfer relay. The contact arm 47 is pivoted as at 49 and is so constructed that it will engage the contact 46 when the coil 28 is energized. It will remain in this position until the coil 29 is energized to disengage it.

The operation of the above-described system is as follows:

Referring particularly to Figure 1, the feeder 34 is connected to the distributing bus by the automatically reclosing circuit breaker, the main contact member of which is shown at 36. In the form of construction shown, the circuit of the reclosing coil 37 is through the resistance 40 and the resistance 55. When the breaker is open and the breaker is to be closed the current passes through the resistance 55 and the contact arm 41. The resistance 55 is connected in across the fixed contacts of the circuit breaker 36 and the resistance 40 is connected with the resistance 55 and in series with the coil 37 and the contact arm 41 is connected to the resistance 40 so as to short circuit the resistance 40 when closed. When, therefore, the connections are completed through the relays of the circuit of the coil 37 the breaker will close. It closes with a quick movement and opens the short circuit through the contact arm 41 as it comes to closed position which cuts in the resistance 40 and reduces the current through the coil 37 to an amount which will, however, be sufficient to hold, or retain, the breaker in its closed position.

If desired, a time controlled overload relay may be added to each feeder circuit and in series with the overload coil 38 that also controls the circuit of the coil 37 as shown in the left hand feeder circuit having the connections of the relays shown quite complete in Fig. 1. Thus an overload coil controlling coil 57 may be located in each feeder 34 to delay closing of the breaker for a period of time after the breaker has been opened in response to an overload on the feeder. When the overload relay 38 opens the circuit of the coil 37, the coil 57 also opens the circuit of the coil 37. Closing movements of the bridging contact 58, that is actuated by the coil 57, is retarded by the action of a suitable device such as the dash pot 59 that delays the reclosing of the bridging contact 58. This will give opportunity for the system to selectively control the reclosing of the breaker as described above, depending upon the connections or disconnections that have been made in the system by the controlling elements. In this closed position, the contact arm 41 is held in open position with the result that the resistance 40 is in series with the reclosing coil 37, the contact arm 41 being held in open position by a suitable spring, such as the spring 54, until it is thrown to closed position by the operation of controlling coil 42 where it will be retained by the spring 54. After the contact member 36 has opened for any reason whatsoever, the circuit for coil 42 will be completed only after the expiration of a definite time interval during which the contact arm 44 is retarded by the dashpot 43. The circuit breaker serves to open the feeder circuit upon short-circuit or overload or voltage failure and, after a predetermined time interval, to place the breaker parts in such position that its main contact will automatically close upon removal of the short-circuit or overload in the manner more fully disclosed in my Patent Number 1,363,814 of December 28, 1920, although this invention is not necessarily limited to the use of the particular type of circuit breaker shown therein, there being other devices such as magnetic switches that may be used.

The circuit breaker is further responsive to conditions in the supply circuit, which is of particular importance in a network of distribution supplied by a number of generating or transformer stations. Herein lies the primary importance of the transfer relays in each circuit with their timing means that enable them to be set to operate at different instants in different feeder circuits, which relays cooperate with a control relay in each supply circuit. The function of these parts in combination will be best illustrated as follows:

Let us assume that plunger 8 of coil 6 is so weighted or adjusted as to require 1000 amperes to raise contact 10 from the points 11 and 12, and bring it into contact with points 13 and 14, also so that the current must decrease to 800 amperes before core 8 will again drop to its lower position so that contact 10 will bridge points 11 and 12. We will further assume that core 9 is adjusted to raise contact 15 out of engagements with points 16 and 17 and into engagement with points 18 and 19, when the current exceeds 1,500 amperes, and that the core will again resume its original position with contact 15 engaging points 16 and 17 when the current drops to a value of 1,200 amperes. It will now be obvious that any current in excess of 1,500 amperes would cause contacts 10 and 15 to complete the circuit of conductor 22 so as to energize wire 23, which in turn will energize coils 33. The operations of the cores in the coils 33 are preferably retarded by timing elements capable of adjustment so that each feeder may be timed for a different value. After the coil 33 which has been set for the shortest time interval has been energized its required time, its contact 31 will complete the circuit to coil 29 with which it is associated which will pull contact 47 out of engagement with contact 46, thus resulting in the opening of main contact 36. The value of the load current in coils 6 and 9 will evidently be decreased upon the opening of the first feeder. Assuming the value of the current in this first feeder 34 to be 200 amperes, the current in coils 6 and 7 will be reduced to 1,300 amperes by the opening of first feeder, as this still leaves a load of 1,300 amperes on the station, contacts 10 and 15 will still remain closed with their associated upper contacts and the next feeder having a coil 33 timed next in order will be opened by the operation of its coil 33 as described above. Assuming this feeder also to be carrying a load of 200 amperes, the total load on station will now have been reduced to 1,100 amperes by the opening of the second feeder. As 1,100 amperes is below the point at which contact 15 will drop away from contacts 18 and 19, it is evident that the circuit to coils 33 will be broken upon the opening of this second feeder so that no more feeders will be disconnected from the distributing bus as long as the current stays below 1,500 amperes, that is, the value of current necessary to raise the bridging contact 15. The station will thus continue operating with two feeders disconnected until the total load decreases to a current value less than 800 amperes at which time contact 10 will bridge points 11 and 12, thus energizing wires 21 and 24. When wire 24 is energized, all coils 26 will be energized and, at the time of the expiration of their respective time intervals as goverened by their settings, will cause contacts 27 to close the circuits of coils 28 at successive intervals. When the first coil 28 is energized, its complemental contact 47 will be again closed with the contact 46 and its associated feeder 34 will again be energized by closing of the main circuit breaker. Both feeders which were disconnected from the distributing bus by the overload on station will be successively connected, provided the total load current is not in excess of the setting of coil 6 or, in this assumed case, does not rise to the 1,000 ampere limit.

It will thus be obvious that the double coil and contact arrangement of overload relay provides a stable means of holding the load on the supply station between certain fixed values. It will further be evident that in a network of distribution which is supplied by a number of generating or transformer stations predetermined feeder circuits may be dropped from any station which is overloaded and fed for a time by some other station or stations, being picked up in a desired order, however, when the overloaded condition ceases to exist.

Referring particularly to Figure 4, a network of distribution is shown which is supplied from four sources of power, all of the breakers being shown in their normally closed position. Each source of power has a distributing bus from which is taken a plurality of feeders, a number of these feeders being connected from the distributing bus at one source of power to the distributing bus at another source of power. An overload on any one of these stations, as station 1, will cause certain selected feeders, as A, B, C and D of station 1 to be disconnected successively from that station by opening the automatic circuit breakers 36 in succession, thereby reducing the load on that station to within the desired predetermined limits. Certain of the feeders may be connected also to the distributing busses of other stations and that portion of the load which was heretofore carried by station 1 will thus be carried by such other station to which the feeders disconnected from station 1 were also connected, such as for example, the station 3. In the event that this should overload such other station, such as station 3, the same operation will take place in that station to disconnect successively that feeder or other feeders according to the selection that has been made and as determined by the setting of the switches 31 associated with each of the feeders in that station and thereby transferring a portion of the load on station 3 to another station or other stations to which the feeders of station 3 are connected and whose circuit breakers at station 3 have thus been opened, such as, to station 4. This transfer of load will thus be continued until the load is finally taken up by the stations which have sources of supply of suitable power for carrying the load, that is, carrying the load added to them. Also, according to the setting of the switches 31, certain of the feeders may be entirely disconnected from one or more of the stations but preferably the selection which is determined on is such as to provide for the shifting of the load of the entire system so as to maintain it by the sources of supply at certain of the stations and thus maintain a balanced relation with reference to the load carrying power of each of the stations. The rearrangement of the connection of the feeders of the different stations are also controlled by the lowering of the current or load that is being drawn from each of the stations and the same rule of setting may be followed so that reconnection of the feeders may be made as may be considered to best serve the conditions of each feeder in particular and the system as a whole. Thus the overload on a station may be shifted to a station that has a lighter load, depending of course on the predetermined setting of the switches 27 and 31 since they may be set so that any chosen one or more feeder circuits will operate at chosen times relative to other feeder circuits. For instance, in a given network of distribution, experience generally shows which feeder circuits are most desirably connected or disconnected first. With this information, the parts may be adjusted in advance and altered from time to time to accommodate these conditions. It will also be understood that the feeder circuits may be connected and disconnected in groups. Likewise, a network of distribution may comprise feeder circuits, some of which are provided with the apparatus described herein and some of which are not so provided.

I further desire to have it understood that in the use of the word "selected" and in the use of the phrases "selectively connecting" or "selectively disconnecting" and words of similar import, I mean to include not only feeder circuits which are selected by previous adjustment either manually or automatically but also feeder circuits which are or may be selected automatically at or about the time of connection or disconnection by apparatus acting in response to current or load conditions in the system.

Having thus described my invention, what I claim is:

1. In a system of electrical distribution, a plurality of sources of current supply, a plurality of interconnecting feeders, automatic circuit breakers in all or a portion of said feeders, means automatically effective to open a breaker at one end of a feeder whenever the aggregate load on the source of current supply to said feeder end exceeds a predetermined value, and means automatically effective to close said breaker when the aggregate load supplied to the other feeders by said source of supply falls below a predetermined value.

2. In a system of electrical distribution, a source of current supply, a plurality of feeder circuits, circuit breakers in all or a portion of said feeders, a means operative by the total current in said source of supply for opening said breakers in a predetermined sequence and at adjustable time intervals with respect to each other until the total load is reduced to a predetermined value.

3. In a system of electrical distribution, a source of current supply, a plurality of feeder circuits, a circuit breaker in each feeder circuit, means governed by the load on the source of supply for opening said breakers selectively and at variable intervals and means governed by the load on the said source of supply for automatically effecting closure of said breakers selectively and at predetermined time intervals.

4. In a system of electrical distribution, a supply circuit, a plurality of feeder circuits, means for automatically and selectively connecting and disconnecting said feeder circuits comprising a two-switch relay in said supply circuit, said switches being responsive to different load values in such a way that when both are raised said means is operated to effect disconnection and when both switches are lowered said first means is operated to effect reconnection, while when one switch alone is lowered neither disconnection nor reconnection will be effected.

5. In a system of electrical distribution, a supply circuit, a plurality of feeder circuits, means for automatically and selectively connecting and disconnecting said feeder circuits comprising means governed by the load on the supply circuit for effecting connection when this load is below a predetermined value, for effecting disconnection when this load is above a predetermined value, and preventing either connection or disconnection when the load is at a chosen range between these values.

6. In a system of electrical distribution, a source of supply, a plurality of feeders connected to the said source of supply and means for automatically limiting the load on the said source of supply by disconnecting a sufficient number of feeder ends adjacent to the said source from the said source to maintain the load below a predetermined value, and means whereby said feeders will be automatically reconnected to the said source at adjustable time intervals whenever the load is below a lesser predetermined value.

7. In a system of electrical distribution, a source of supply, a plurality of feeders connected to said source, switch mechanism in each of said feeders, a relay in said source controlling the operation of said switches in such a manner that when the load on said source exceeds a predetermined value said switch mechanism will be caused to operate to disconnect successive feeders at predetermined time intervals until the load on the source has been decreased to a predetermined value, and at a lesser predetermined value to successively connect said feeders until the load on said source has been increased to a predetermined value or all the feeders have been reconnected.

8. In a system of electrical distribution, a source of current supply, a plurality of feeder circuits, means for automatically opening and closing a feeder circuit in response to load conditions in such feeder circuit and also in response to the aggregate load on the said source of supply.

9. In a system of electrical distribution, a source of current supply, a plurality of feeder circuits, circuit breakers in said feeder circuits, means for automatically opening and closing said circuit breakers in response to load conditions in such feeder circuits, and also in response to the aggregate load on the said source of supply, said means being such that one or more of the breakers will be opened when the aggregate load on said source is in excess of a predetermined value and will be reclosed when said aggregate load is below a predetermined value.

10. In a system of electrical distribution, a source of current supply, a plurality of feeder circuits, means for automatically opening and closing a feeder circuit in response to load conditions in such feeder circuits, and also in response to the aggregate load on the said source of supply, said means being such that the breaker will be opened when the aggregate load on said source is in excess of a predetermined value and will be reclosed when said aggregate load is below a predetermined value while neither disconnection or reconnection will take place while the aggregate load is within a predetermined range of load values.

11. In a system of electrical distribution, a source of current supply, a plurality of feeder circuits, means for automatically opening and reclosing any one of said feeder circuits in response to load conditions on such feeder circuit, and means for automatically and successively opening said feeder circuits selectively in response to load conditions on said source of supply and automatically and successively reclosing said feeder circuits in response to restoration of normal load conditions on said source of supply and for maintaining a range of stable load values wherein said feeder circuits will be neither connected nor disconnected.

12. The combination of a main electrical circuit, two auxiliary circuits, and means operable to close either auxiliary circuit or to open both auxiliary circuits in response to changes in current in said main electrical circuit.

13. In combination with a load circuit, two auxiliary circuits, and two electrically operated switches operative in response to different load values, said circuits and switches being so related that the switches may cooperate to close either circuit or may operate independently to open either circuit.

14. In combination with a main circuit, two auxiliary circuits, and a means that is operable to close one auxiliary circuit at a relatively low current in the main circuit to close the other auxiliary circuit at a relatively high current in the main circuit and to close neither auxiliary circuit at a predetermined intermediate range of current values.

15. In combination, an electrical circuit, two double throw switches operable in response to load conditions in said circuit, two auxiliary circuits so arranged that when both switches are closed in one direction one auxiliary circuit is closed, when closed in the opposite direction the other auxiliary circuit is closed, but when either switch is closed in the first direction and the other switch is closed in the opposite direction both auxiliary circuits are open.

16. In a system of electrical distribution, a supply circuit, a plurality of feeder circuits, means for automatically and selectively connecting the feeder circuits to the supply circuit, means for automatically and selectively disconnecting the feeder circuits from the supply circuit, and a two-switch relay in said supply circuit comprising one coil operated switch movable to alternately bridge two pairs of contacts, a second coil operated switch movable to alternately bridge two pairs of contacts, the first of said coil operated switches being movable between alternate positions by existence or failure of a relatively low current value in said supply circuit, the second of said coil operated switches being movable between alternate positions by the existence or failure of a relatively high current value in said supply circuit, said switches being so arranged that when operated in one direction they effect disconnection of the feeder circuits selectively and when operated in the other direction they effect connection of said feeder circuits selectively and when only one switch moves neither disconnection nor reconnection will be brought about and equilibrium of the apparatus will be maintained.

17. In combination, a main circuit, two auxiliary circuits and two coils energized as a function of the current in the main circuit, one coil operating a switch movable to alternately bridge two pairs of contacts, the second coil operating a switch movable to alternately bridge two pairs of contacts, the first of said switches being movable between alternate positions by existence or failure of a relatively low current value in said main circuit, the second of said switches being movable between alternate positions by the existence or failure of a relatively high current value in said main circuit, said switches being so arranged that when operated in one direction they bridge contacts which complete one auxiliary circuit and when operated in the other direction they bridge contacts in the auxiliary circuit, and when only one switch moves neither auxiliary circuit is closed.

18. A source of electrical current, a feeder for said source and a plurality of coils governed by current in said feeder, two control circuits each having a set of spaced contacts so arranged that when current is below a certain predetermined value, the spaced contacts of one control circuit will be bridged, and when the current is in excess of a predetermined value the spaced contacts of the other circuit will be bridged.

In testimony whereof I hereby affix my signature.

ESTELL C. RANEY.